United States Patent [19]
Sato et al.

[11] 3,778,823
[45] Dec. 11, 1973

[54] VEHICLE SAFETY DEVICE

[75] Inventors: Kazuo Sato; Tomio Hisatsune; Minoru Izawa, all of Toyota, Japan

[73] Assignee: Toyota Jidosha Kogyo Kabushiki Kaisha, Toyota-shi, Aichi-ken, Japan

[22] Filed: Apr. 15, 1971

[21] Appl. No.: 134,348

[30] Foreign Application Priority Data
Dec. 27, 1970 Japan.............................. 45/126238

[52] U.S. Cl. ............ 343/7 ED, 340/1 R, 343/5 PD, 343/112 CA
[51] Int. Cl. ................................................. G01s 9/02
[58] Field of Search ........ 343/7 ED, 5 PD, 112 CA, 343/15; 340/1 R

[56] References Cited
UNITED STATES PATENTS

| 3,283,292 | 11/1966 | Kay ...................................... 340/1 R |
| 3,383,678 | 5/1968 | Palmer ............................... 343/5 PD |
| 3,343,167 | 9/1967 | Rademacher ..................... 343/5 PD |
| 3,031,644 | 4/1962 | Hisserich et al. .................. 340/1 R |
| 3,394,342 | 7/1968 | Walker ............................. 343/7 ED |
| 3,300,768 | 1/1967 | Bystrom et al. .................. 343/5 PD |
| 3,036,219 | 5/1962 | Thompson ....................... 343/5 PD |

*Primary Examiner*—Benjamin A. Borchelt
*Assistant Examiner*—G. E. Montone
*Attorney*—Toren and McGeady

[57] ABSTRACT

The disclosed apparatus detects an imminent collision between a vehicle and an object, by orienting respective receiver and transmitter antennas, mounted on the vehicle, so their patterns intersect and form a crash detecting zone just ahead of the vehicle, and by deriving the relative speed between the vehicle and the object in the crash zone from an undulatory signal radiated by the transmitter antenna and the reflected undulatory signal received from the object. A generator, a directional coupler, and a detector all associated with the antennas, derive the relative speed between the vehicle and the object on the basis of homodyne detection of the transmitted undulatory signals and the reflected undulatory signals. The presence of the objects within the crash zone is indicated by receipt of an undulatory signal above a given level. When both relative speed and level exceed their respective threshold values, threshold circuits issue signals. An AND circuit responds to the signals and actuates a safety device such as an air bag for protecting passengers. To prevent erroneous actuation of the safety device when the vehicle and the object are on course passing each other, antennas on the left and right sides of the vehicle receive reflected signals and form respective Doppler frequencies. A divider determines the relative angle between the vehicle and the object by calculating the ratio of these Doppler frequencies. When the ratio exceeds a predetermined value, comparators direct a signal to disable the AND circuit.

28 Claims, 9 Drawing Figures

FIG. 6 ated so that the beams of the two antennas intersect at a predetermined zone ahead of the vehicle. Generating means cause the transmitting antenna to radiate a signal and receiving means coupled to the receiving antenna confirm the presence of an object only when the object has entered the predetermined zone and reflected the radiated signals to the receiving antenna. The receiving means derive the speed of the object relative to the vehicle at the time the object enters the predetermined zone. The zone is selected by orientation of the antennas so that only objects which would inevitably crash into the vehicle enter the zone at speeds greater than a given speed. Thus the imminence of a primary crash is detected when an object is detected and the relative speed exceeds the given speed or value.

VEHICLE SAFETY DEVICE

BACKGROUND OF THE INVENTION

This invention relates to vehicle safety devices, and particularly to apparatuses for preventing injury to passengers of a vehicle during collision.

When a moving vehicle such as an automobile collides with an object such as another vehicle or an obstacle in its path, the occupants in the vehicle are thrown forward of their own inertia and strike hard against a portion of the vehicle. The initial collision between the vehicle and the object is called the primary crash. The occupants' striking a portion of the interior of the vehicle is called the secondary crash. Such secondary crashes can seriously injure the occupants of the vehicle.

One system that attempts to prevent such injuries utilizes a conveniently located air bag capable of being inflated by delivering gas to the air bag upon occurrence of the primary collision between the vehicle and the object. Thus the vehicle's occupants strike the air bag when they are thrown forward of their own inertia. The air bag is adapted to absorb the impact energy resulting from a collision by deflation of the air bag. This protects the occupant or occupants from being injured in a secondary crash.

In order to actuate a safety device of the type described, a known system utilizes an impact detector which physically detects as an impact, contact of the vehicle with an object. For example, one system utilizes a contact needle protruding in the forward direction at the front of the vehicle. It thus detects a crash when the contact needle touches any object.

Another system utilizes an accelerometer mounted in the vehicle. A collision is thus detected when the accelerometer detects the sudden deceleration of the vehicle during the primary crash.

In such systems a protective apparatus such as an air bag is inflated by delivering gas into the air bag only when an impact detector is actuated by the impact force resulting from a collision. However, experiments show that the secondary crash usually follows the primary crash within a very short time interval, on the order of about 40 ms, after the instant at which the primary crash occurs. Therefore safety devices for protecting vehicle passengers as described above cannot effect their desirable results unless inflation of the air bag is completed within the beforementioned short time interval prior to the occurrence of the secondary crash.

In order to overcome this problem it has been proposed that the air bag be inflated by utilizing gas produced in an explosion of black powder, or by utilizing gas supplied from a high pressure gas storage tank which holds gas at pressures of the order of 200 to 300 atmospheres. However, such rapid inflation of an air bag may cause a sudden increase in pressure in the remaining portion of the interior of the vehicle, especially when it is completely or almost completely enclosed. This may subject the occupants of the vehicle to secondary injuries, such as rupture of the tympanic membrane.

Moreover, in systems of the type which detect the vehicle's impact force, the degree or probability of injuries which may be inflicted upon a vehicle's occupants may vary with the location of the impact detector or the direction of the collision, even if the impact detector always responds to the same impact force. Additionally there may be a time delay from the time of impact to the time the preset impact value is reached. This impact value is determined experimentally as the impact value at which injuries may be caused to a human body upon occurrence of a secondary crash. This time delay is not uniform. Consequently, known systems utilizing the impact force have serious drawbacks that prevent air bags from being fully effective.

An object of this invention is to eliminate the above mentioned disadvantages.

Another object of the invention is to improve such safety devices.

Still another object of the invention is to assure complete inflation of an air bag before the secondary crash without inflating the bag so rapidly as to cause a sudden pressure increase in the interior space of the vehicle.

Yet another object of this invention is to protect the safety of a vehicle's occupants from injuries resulting from a secondary crash with substantial assurance and reliability and yet at the same time prevent actuation of the safety device that protects the passengers, such as the inflation of an air bag, at times when actual crashes do not occur. In other words, it is an object of this invention to actuate a safety device such as an inflatable air bag each time a crash occurs and to avoid such actuation at all other times.

SUMMARY OF THE INVENTION

According to a feature of the invention a transmitting antenna and a receiving antenna, both having very sharp directivity, are mounted at the front of the vehicle carrying the passengers to be protected and oriented so that the beams of the two antennas intersect at a predetermined zone ahead of the vehicle. Generating means cause the transmitting antenna to radiate a signal and receiving means coupled to the receiving antenna confirm the presence of an object only when the object has entered the predetermined zone and reflected the radiated signals to the receiving antenna. The receiving means derive the speed of the object relative to the vehicle at the time the object enters the predetermined zone. The zone is selected by orientation of the antennas so that only objects which would inevitably crash into the vehicle enter the zone at speeds greater than a given speed. Thus the imminence of a primary crash is detected when an object is detected and the relative speed exceeds the given speed or value.

By virtue of this feature the imminence of a primary crash is detected with certainty in advance of the primary crash. According to another feature of the invention a collision detecting signal is produced when the object enters the predetermined zone at speeds greater than the given speeds so as to indicate an inevitable collision. This collision detecting signal actuates a safety device such as an air bag for protecting vehicle passengers when a potential collision of the vehicle with an object in its path becomes definitely inevitable. This protects the safety of the vehicle's occupants from injuries resulting from a secondary crash.

Because of the last feature, inflation of the air bag can be started before the primary collision and can be completed well before a vehicle's occupant is thrown forward by his own inertia upon occurrence of the primary crash.

These features thus provide a device for detecting potential collisions, wherein the inevitability of a primary crash is determined with certainty and a collision detecting signal issues when the primary crash becomes inevitable. This protects the vehicle's occupants from any secondary crash.

According to still another feature of the invention, the generator means generates undulatory signals of constant frequency, a microwave circuit in the receiving means derives a Doppler signal by mixing and detecting the transmitted undulatory signal and the received undulatory signal reflected by the object, a frequency-voltage converter in the receiving means obtains a voltage proportional to the frequency of the Doppler signal, a threshold circuit issues a signal when the voltage exceeds a predetermined value, a speed threshold circuit issues a signal when the level of the Doppler signal exceeds a predetermined value, and an operating AND circuit issues a collision detecting signal in response to the output signals of both threshold circuits.

According to still another feature of the invention, transmitting and receiving antennas are installed at the front left and front right sides of the vehicle and the relative speeds between the vehicle and the object are derived at the left and right sides from Doppler signals obtained by left and right hand side microwave circuits. Calculating means determine the relative angle between the vehicle and the object by means of a circuit capable of obtaining the ratio of the relative speed at the right and left sides. This detects the possibility of a collision as compared to the object and the vehicle passing each other.

According to another feature of the invention, the collision detecting signal is inhibited when an object in the path of the vehicle is a moving object such as an automobile and the angle made by the direction of movement of the object and that of the vehicle is great so that they will not actually crash but pass each other. This also occurs when the object passes directly in front of the vehicle. A collision detecting signal is thus issued only when the relative angle is small and the occurrence of a primary crash is inevitable.

These and other features of the invention are pointed out in the claims. Other objects and advantages of the invention will become obvious from the following detailed description when read in light of the accompanying drawings.

DETAILED DESCRIPTION OF PREFERRED EMBODIMENTS

Figure 1A:
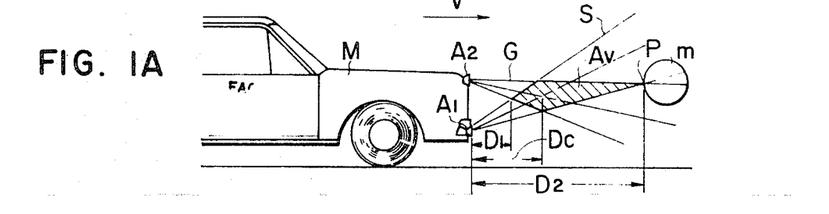
FIG. 1A is a side elevation of an automobile illustrating the intersecting directional beam patterns of antennas mounted on the automobile.

In FIG. 1A a vehicle M carries a potential collision detecting device embodying features of the invention. On the vehicle M a transmitting antenna $A_1$ radiates microwaves along a radial beam S formed by the vertical directivity of the transmitting antenna. A receiving antenna $A_2$ also mounted at the front of the vehicle M forms a directive beam pattern G. The transmitting and receiving characteristics of the antennas are reverible. Therefore, if the two antennas have the same characteristics the beam S becomes identical to the beam G. The intersection of the beams S and G, shown by the shaded portion in FIG. 1A form a sensitive region or zone $Av$. In FIG. 1A this sensitive region is illustrated in the vertical direction when viewed laterally from the side of the vehicle M. Only when an object $m$ enters this sensitive region $Av$ are the microwaves radiated from the transmitting antennas $A_1$ reflected from a point P on the object $m$ facing the vehicle M and received by the receiving antenna $A_2$. 57 According to the invention the antennas $A_1$ and $A_2$ of the potential collision detecting system are installed at angles so that the region $Av$ is located 1 to 2 meters ahead of the vehicle. The strength of the signal received rises when the vehicle M approaches the object $m$ that is to say the levels of the received undulatory signals increase as the distance D between the vehicle M and the object $m$ decreases. The variation of the levels of the received signal, by the antennas' forming the sensitive region $Av$ described above, is shown in FIG. 2.

Figure 2:
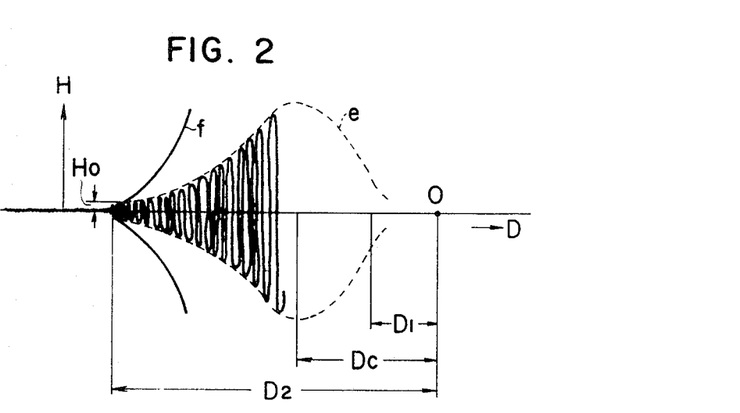
FIG. 2 is an amplitude distance graph illustrating the amplitudes of wave forms reflected from objects in the sensitive region.

In FIG. 2, the forward end of the vehicle M is indicated by 0, which coincides with the tips of the transmitting and receiving antennas $A_1$ and $A_2$. In microwave circuits, an electromagnetic horn is frequently used to improve the directivity. In such a case, this point coincides with the open end of the horn. The abscissa represents the distance D between the extreme end of a vehicle and an object. The ordinate represents the level H of the signal obtained by the receiving antenna $A_2$ when the distance between the vehicle and the object $m$ is D. In other words, when the object $m$ is located at a distance $D_2$ or more from the vehicle, the level of the received signal is almost zero. This level increases suddenly as the object $m$ enters the sensitive region $Av$ and further increases as the object $m$ approaches the vehicle M.

The distribution of the electromagnetic field of the microwaves is not uniform along the beam width. Rather it follows a normal distribution having a maximum value at the center axis of the beam. The level H of the received signal reaches a maximum at the position Dc where the center axes of the beams intersect. The level H of the received signal decreases as the distance between the vehicle M and the object m further decreases. Thus the relation of the distance D between the vehicle M and the object m with respect to the level H is indicated by the envelope l.

As shown in FIG. 2, some degree of signal level is observed even when the distance between the vehicle and the object is less than $D_1$ due to the scatter of microwaves. However, for purposes of this invention even a high signal level at distances less than $D_1$ produce no problems or trouble.

The level of the received signal varies with the reflection factor and dimensions of the object m. Objects having high reflection factors or large reflection surfaces change the envelope to a form shown by the curve f. However, here the sudden increase in level occurs at the distance $D_2$. This point never varies with the material, shape or other characteristics of the object. Therefore, the relative distance D between the vehicle and the obstacle or object m can be accurately determined by this sensitive region or sensitivity zone Av which embodies a feature of this invention. More particularly the sensitive zone Av accurately determines when an object is closer to the front of the vehicle than the end of the sensitive zone Av.

Figure 1B:
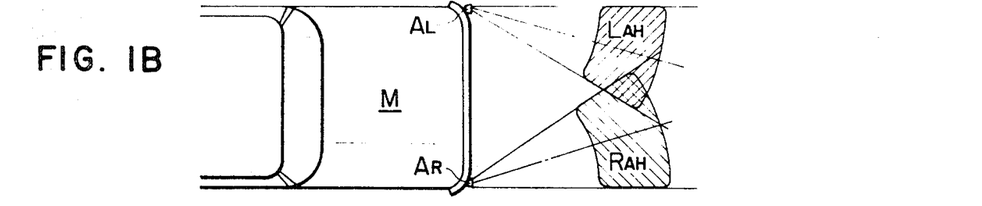
FIG. 1B is a plan view of the automobile in FIG. 1A illustrating the beam patterns formed by the intersections of a pair of antenna beams on the right side of the automobile and a pair of antenna beams from the left side of the automobile.
Figure 1C:
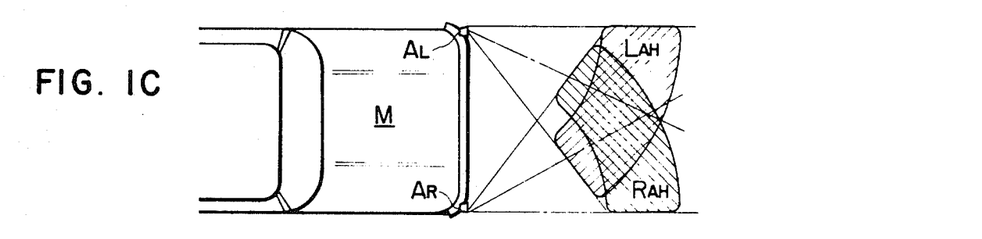
FIG. 1C is another plan view of the automobile in FIG. 1B illustrating another antenna beam pattern comparable to that of FIG. 1B.

FIG. 1A illustrates the antennas $A_1$ and $A_2$ on one side of the vehicle M. These antennas $A_1$ and $A_2$ form an antenna pair $A_R$ and are mounted on the right side of the vehicle as shown in FIG. 1A. According to the invention a similar pair $A_L$ of antennas is mounted on the left side of the vehicle. The two pairs of antennas are illustrated more particularly in FIGS. 1B and 1C. FIGS. 1B and 1C also illustrate the sensitive regions or zones Av of the antenna pair $A_R$ and of the antenna pair $A_L$ in the horizontal direction when viewed from the top of the vehicle M. the left hand antenna pair $A_L$ forms the sensitive region which in the horizontal direction has the shape indicated by the portion $L_{AH}$. This is defined as the horizontal sensitive region or horizontal sensitive zone. The corresponding sensitive region formed by the right hand antenna pair $A_R$ as viewed from the top is indicated by $R_{AH}$. The horizontal sensitive regions $L_{AH}$ and $R_{AH}$ overlap in FIG. 1B. In FIG. 1C these sensitive regions are formed so as to overlap with each other still more. This is done by spreading the horizontal directivities of the antenna pairs $A_L$ and $A_R$.

With the antenna pairs $A_L$ and $A_R$ the presence of an object is detected reliably, and with accuracy when the vehicle M approaches the object m in its path closer than the predetermined distance $D_2$. It is, of course, not necessary or desirable to utilize signals indicating the presence of all objects within the sensitive region. For example, if the vehicle M is parked behind another vehicle within the sensitive region it is not necessarily desirable to utilize signals obtained from sensing the presence of the other vehicle. It is necessary to utilize the signals only when there is a predetermined relative motion between the vehicles or between the vehicle M and the object m.

When the vehicle M approaches the object m at the relative speed v, the frequency $f_t$ of the signal transmitted from the transmitting antenna $A_1$ is reflected from the object m and is received by the receiving antenna $A_2$. At this time the frequency $f_r$ of the received signal is shifted due to the Doppler effect. The Doppler frequency $f_d$ thus obtained is approximately expressed by the formula $$f_d = f_r - f_t = 2f_t \cdot v/c \qquad 1$$

In this formula c is the propagation speed of microwaves.

As seen from the formula of 1 the Doppler frequency $f_d$ is proportional to the relative speed v. Therefore the relative speed v can be obtained by detecting the Doppler frequency. If the distance between the vehicle M and the object m is D and the distance and the object approaching each other at a relative speed v the vehicle M will crash into the object m after the time D/v. Under such conditions the collision is inevitable within the specified period of time because of the braking and steering characteristics of the vehicle, however hard the brake is applied or however skillfully the vehicle is steered in an effort to avoid a crash. This specified period of time is determined experimentally. The system according to this invention includes a controller mounted in the vehicle M and coupled to the antenna pairs $A_R$ and $A_L$ L to issue a collision detecting signal. This controller which includes the receiving means coupled to the receiving antennas $A_2$ detects that the object M has come within the sensitive region $A_v$ and the relative speed at this time exceeds the predetermined value. The controller then actuates a device such as an air bag or the like to protect the occupants of the vehicle.

The controller in the vehicle M also takes care of the situation when the object m enters the sensitive region at an angle which would avoid a crash so that the vehicle and the object pass each other without crashing. That is to say the controller inhibits issuance of a collision detecting signal when the relative angle between the object m and the vehicle M is sufficiently great so that even if the object m comes within the sensitive region the vehicle would not crash into the object but the two would pass each other. In order to determine whether the vehicle would actually crash into the object or whether they would pass each other the controller determines the relative angle of travel between the two. The controller accomplishes the determination of the relative angle according to the principle described with reference to FIG. 3.

Figure 3:
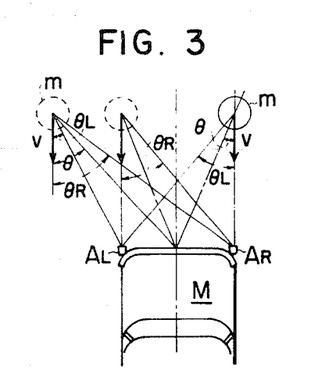
FIG. 3 is a plan view of an automobile illustrating the angular relationships between objects ahead of the vehicle and the antennas on the vehicle so as to show the principle of the operation of an embodiment of this invention.

FIG. 3 illustrates the condition when the object m moves towards the vehicle M in the direction shown by the arrow at the speed v and the relative angle θ. The Doppler frequencies $f_d$ obtained in the controller from the left and right antenna pairs $A_{L\ and\ AR}$ installed on the vehicle M under the above described condition are expressed as follows:

$$f_{dL} = (2f_t/c)\ v\cos\theta_L \qquad 2$$

$$f_{dR} = (2f_t/c)\ v\cos\theta_R \qquad 3$$

In the above formulas $f_{dL}$ and $f_{dR}$ are the Doppler frequencies derived by the controller from signals detected by the left and right antenna pairs $A_L$ and $A_R$, respectively. $\theta_L$ and $\theta_R$ are the angles formed by the respective antennas and the moving direction of the object m, respectively. The ratio of $f_{dL}$ and $f_{dR}$ is obtained as follows:

$$\epsilon = f_{dL}/f_{dR} = \cos\theta_L/\cos\theta R \qquad 4$$

As shown in FIG. 3, the value ε is equal to unity when the object m approaches the vehicle M from directly ahead. On the other hand the value of $\epsilon$ is determined by calculation in the controller when the object passes the vehicle without crashing into the vehicle. In other words, the controller is set beforehand to issue collision detecting signals only within a predetermined range within which the vehicle and object will contact each other, depending upon the size of the vehicle, the position of the sensitive region and other factors. Thus the controller detects potential collisions and issues signals therefore when the value of $\epsilon$ is within the predetermined range. The predetermined range has its bounds when the object and the vehicle will just contact each other.

Figure 4:
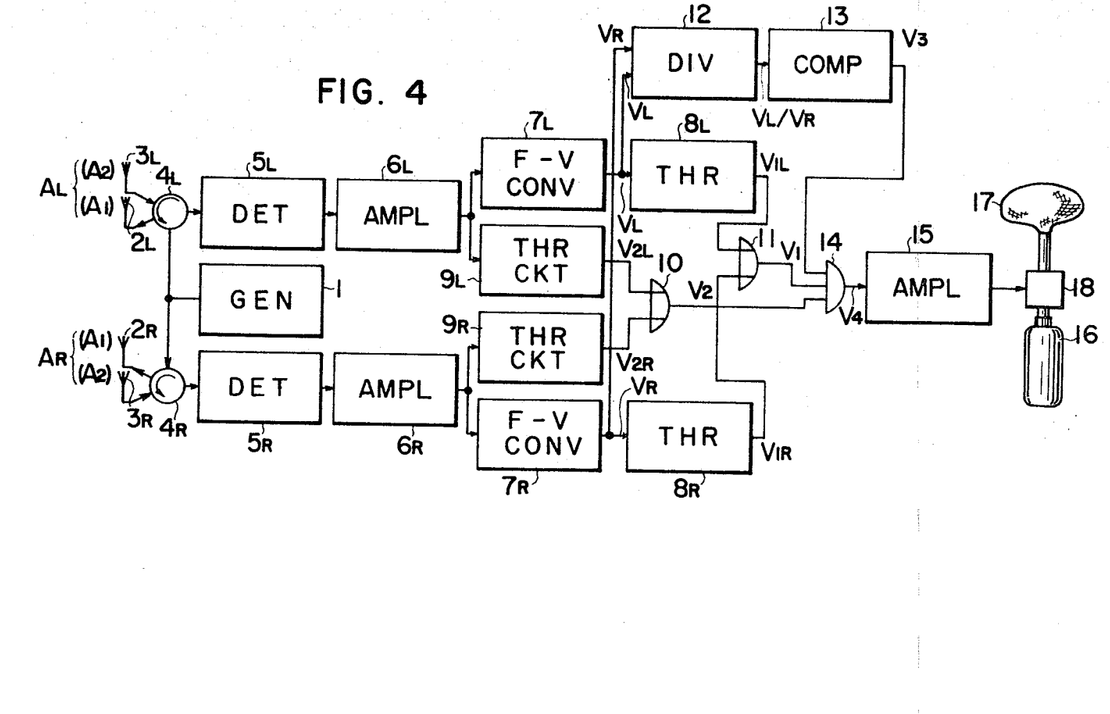
FIG. 4 is a block diagram illustrating the overall structure of an embodiment of the invention wherein the potential collision detecting system actuates a safety device employing an air bag for protecting the vehicle's passengers.
Figure 5:
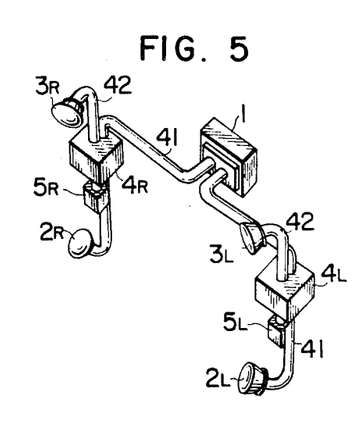
FIG. 5 is a perspective drawing illustrating the structure of microwave circuits employed in an embodiment of this invention.
Figure 6:
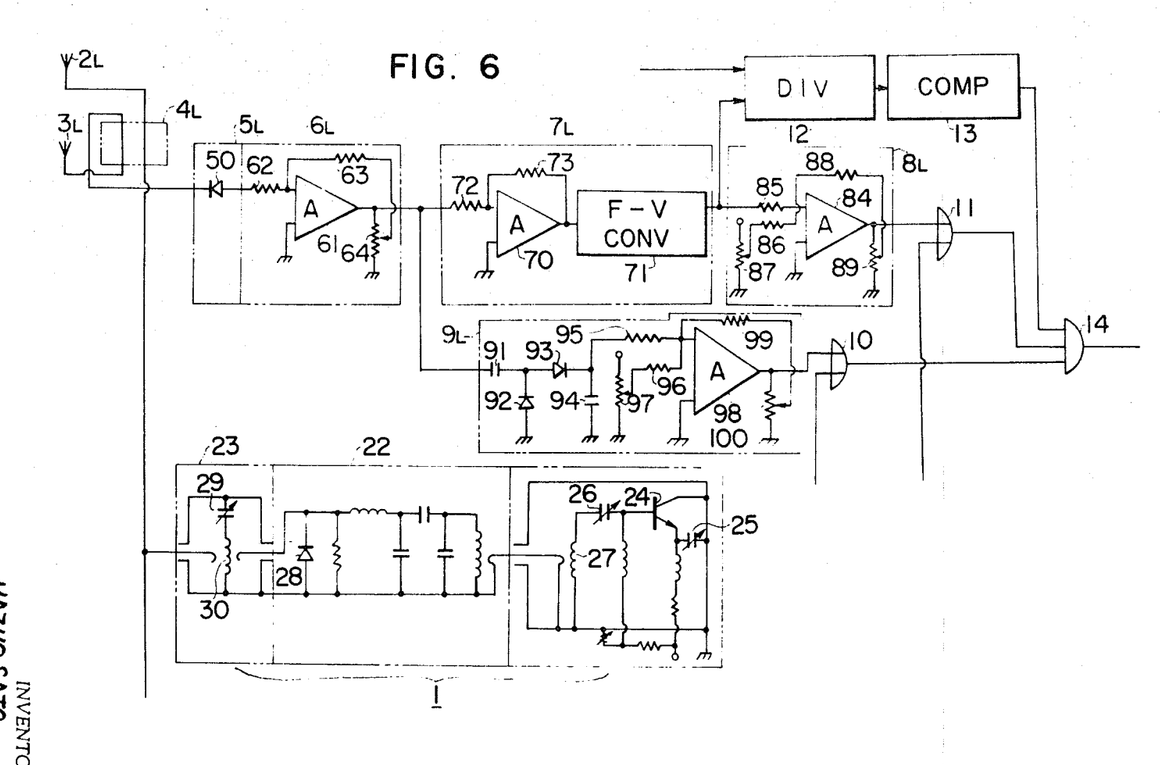
FIG. 6 is a detailed schematic circuit diagram of portions of the circuit in FIG. 5.

FIGS. 4, 5 and 6 illustrate details of the potential collision detecting device according to the invention including the controller. The entire apparatus is mounted within the vehicle M. In FIG. 4 a generator 1, namely the beforementioned generator, generates microwaves having a predetermined frequency. These signals from the generator are applied to the antennas $A_1$ that make up the transmitting antennas in the antenna pairs $A_L$ and $A_R$. For simplicity, and especially to maintain continuity of reference numerals in FIG. 4, the antennas $A_1$ of the antenna pairs $A_L$ and $A_R$ are designated 2L and 2R. Thus the antenna 2L is the transmitting antenna which is installed at a desired location at the front left side of the vehicle M and adapted to radiate microwaves. The antenna 2R is the transmitting antenna which is installed at the desired location on the front right side of the vehicle and adapted to radiate microwaves. The receiving antennas $A_2$ in the antenna pairs $A_L$ and $A_R$ are designated 3L and 3R in FIG. 4. Thus the antenna 3L designates the receiving antenna installed at the front of the vehicle M so that its beam intersects the radial beam of the transmitting antenna 2L at a predetermined position. Similarly the antenna 3R designates a receiving antenna which is installed at the front of the vehicle M so that its beam pattern intersects the radial beam pattern of the transmitting antenna 2R at a predetermined position. The suffix L indicates those component parts mounted at or belonging to or concerned with the left side of the vehicle M. The suffix R in the reference characters indicate component parts mounted on or belonging to or concerned with the right side of the vehicle M. Since these component parts perform the same function the explanation will be limited to some extent to those mounted on the left side. It will be understood therefore that the corresponding component parts having the same numeral in the reference character but ending in the suffix R cooperate with the other parts in the same manner as described.

A directional coupler 4L couples the signals from the generator 1 to the antenna 2L. The coupler 4L further couples the reflected signals from the antenna 3L to a detector 5L together with part of the transmitted signal originating in generator 1. The detector 5L applies a Doppler signal composed of the difference frequency between the signal from the generator 1 and the signal in antenna 3L reflected from the object, to an amplifier 6L. A frequency-voltage converter 7L forms a voltage of the Doppler frequency and applies it to a threshold circuit 8L which issues output signals only when the voltage exceeds a predetermined value. A threshold circuit 9L also issues output signals only when the level of the output signal from the amplifying unit 6L exceeds a preset value.

The value of the constant voltage set at the threshold circuit 8L is a voltage corresponding to the critical relative speed at which the relative speed v is just low enough that no injury is inflicted on the vehicle's occupants because of the very small impact force, even if the vehicle M crashes into the object $m$. The specified level set at the threshold circuit 9L is the level $Ho$. in FIG. 2. This level is determined as the critical level, which when exceeded, indicates the presence of the object m in the sensitive region. The output voltage of the threshold circuit 9L is identified as the voltage $V_{2L}$. The output voltage of the threshold circuit 8L is identified as $V_{1L}$.

The existence of voltages $V_{1L}$ and $V_{2L}$ indicate that the left antennas 2L and 3L have detected the existence of an object $m$ in their sensitive region and that the object was traveling at a speed relative to the vehicle M greater than that predetermined to be harmful.

In the same manner as described above the generator 1 applies signals to the antenna 2R and these signals are reflected in the sensitive zone or region to the receiving antenna 3R. A directional coupler 4R applies a combination of the transmitted signal and received signal to a detector 5R. An amplifier 6R, frequency to voltage converter 7R, threshold circuit 8R, and threshold circuit 9R operate identicaly with the respective components 5L, 6L, 7L, 8L and 9L to produce voltages $V_{1R}$ and $V_{2R}$. The existence of the voltage $V_{2R}$ indicates the presence of an object in the sensitive zone defined by the antenna 2R and 3R. The existence of a voltage $V_{1R}$ indicates that the object in the sensitive region defined by the antenna 2R and 3R is traveling at a relative speed which is considered to be dangerous.

An OR gate circuit issues a signal when either of the threshold circuits 9L or 9R issues their respective output signals $V_{2L}$ or $V_{2R}$. Thus, if there exists an object in either of the sensitive regions defined by the antennas 2L and 3L or 2R and 3R the OR gate circuit issues a signal $V_2$. An OR gate circuit issues a signal $V_1$ when either of the threshold circuits 8L or 8R issues an output signal. Thus the voltage $V_1$ appears if the speed of the object in either of the sensitive regions relative to the vehicle M is determined to be dangerous.

A divider 12 calculates the ratio of the output voltages $V_L$ and $V_R$ of the frequency voltage converters 7L and 7R. This divider in effect then measures the ratio of the relative speed in the left sensitive zone as compared to the relative speed in the right sensitive zone. A comparator 13 issues an output signal only when the output $\epsilon$ of the divider 12 is within the predetermined range. An AND gate circuit issues output signals only when the outputs are generated simultaneously from the comparator 13, the OR gate circuit 10 and the OR gate circuit 11. An amplifying unit 15 amplifies the output of the AND gate circuit 14.

A tank 16 storing high pressure gas for inflating an air bag 17 installed in the vehicle M at the location where the secondary crash is most likely to occur, communicates with the air bag when an electromagnetic valve 18 between the tank and the air bag receives an output signal from the amplifying unit 15.

Further details of the operation of the potential collision detecting device described above are discussed hereinafter with reference to FIGS. 5 and 6. These figures illustrate the device in more detail. In these figures parts corresponding to those of FIG. 4 are identified by the same reference numeral.

The generator 1 comprises an oscillation circuit 21, a doubler circuit 22, and a coaxial resonance circuit 23. The oscillation circuit 21 includes an oscillating transistor 24, resonance capacitors 25 and 26, a resonance coil 27 and additional components utilized in standard oscillators. The initial frequency signal derived from the oscillating circuit 21 is directed to the idler circuit of a doubler circuit which consists of a plurality of coils and capacitors. Here a high harmonic is produced by means of a varactor diode 28 provided at the output side of the idler circuit and having a non-linear characteristic. In the coaxial resonance circuit 23, the high harmonic of a specific order is taken out as microwaves by means of a resonant circuit including a variable capacitor 29 and a coil 30.

As shown more particularly in FIG. 5 the microwaves are directed through a main wave guide 41 to the two directional couplers 4L and 4R. The microwaves directed to the left hand directional coupler 4L radiate through the electromagnetic horn type transmitting antenna 2L in the forward direction of the vehicle. An object such as the object $m$ in the sensitive region determined by the antenna 2L and 3L reflects the microwaves. The latter are then received by the left hand side receiving antenna 3L. The signal thus received is again directed through an auxiliary wave guide 42 to the directional coupler 4L and is then passed to the detector 5L together with part of the transmitted signal.

The detector 5L includes a detecting diode 50. By utilizing the non-linear characteristic of the diode, the Doppler signal having the difference frequency between the output signal of the generator 1 and the signal reflected from the object is obtained. The Doppler signal is amplified by the linear amplifying unit 6L. The latter comprises an amplifier 61, and input resistor 62, a negative feedback resistor 63 and a gain adjusting resistor 64. The output of the linear amplifier is fed into the frequency voltage converter 7L and the threshold circuit 9L.

The frequency voltage converter 7L includes a saturation amplifying circuit having an amplifier 70, an input resistor 72 and a negative feedback resistor 73. It also includes a frequency voltage converting circuit 71. This circuit produces a unidirectional voltage, that is a direct-current voltage, $V_L$, proportional to the frequency of the Doppler signal. A threshold circuit 8L receives the output voltage $V_L$ and produces a signal voltage $V_{1L}$ only when the unidirectional voltage $V_L$ exceeds a specified value. In the threshold circuit 8L an amplifier 84 and resistors 85, 88 and 89 form an amplifying circuit which further includes a bias circuit composed of resistor 86 and 87. The threshold voltage is set by adjusting the resistor 87 with respect to the voltage to be applied to the bias circuit.

The Doppler signal applied to the threshold circuit 9L is rectified by a voltage doubler diode circuit comprising capacitors 91 and 94 and diodes 92 and 93. The Doppler signal is converted to a unidirectional voltage proportional to the level of the Doppler signal. Then, this voltage is applied to a non-sensitive circuit comprising a linear amplifier circuit with an amplifier 98 and resistors 95, 99, 100 and a bias circuit of resistors 96 and 97. The signal $V_{2L}$ is derived from the threshold circuit 9L only when the direct current voltage, that is the unidirectional voltage, exceeds a certain value.

The microwave components identified as 1, 2R, 3R, 4R, and 5R, and the circuits 6R, 7R, 8R and 9R on the right side of the vehicle M serve to process the Doppler signal in a manner substantially identical to these components and circuits having the same numeral but with the suffix L. The voltage $V_R$ is derived from the frequency voltage converter 7R. The signal $V_{1R}$ and $V_{2R}$ are derived from the threshold circuits 8R and 9R, respectively. The voltage $V_L$ and $V_R$ are applied to the divider 12 which derives the voltage $V_\epsilon$ proportional to the ratio $\epsilon = V_L/V_R$ of the two voltages $V_L$ and $V_R$. The voltage $V_\epsilon$ is applied to the comparator 13 and a signal $V_3$ is issued only when the value $V_\epsilon$ is within a predetermined range. The output signals $V_{1L}$ and $V_{1R}$ from the threshold circuit 8L and 8R are directed to the OR gate circuit 11. The output signal $V_1$ issues from the OR gate circuit 11 when at least either of the output signals is present. The output signals $V_{2L}$ and $V_{2R}$ from the threshold circuit 9L and 9R appear at the OR gate circuit 10. The output signal $V_2$ issues from the OR gate circuit 10 when at least either of these output signals is present. The signals $V_1$, $V_2$, and $V_3$ are directed to the AND gate circuit 14. The latter issues a signal $V_4$ only when all of these signals applied thereto are present. The signal $V_4$ then appears at the amplifying unit 15.

As illustrated in FIG. 1A the transmitting antenna is installed below the receiving antenna. This method of installation of antennas is effective to reduce noise resulting from irregular reflection of radiation from the road surface, from scatter, or the like. The threshold voltages set at the threshold circuit 9L and 9R correspond to the level $Ho$ illustrated in FIG. 2. They furnish the limit for confirming that the object m has entered the sensitive region. The threshold voltages set at the threshold circuit 8L and 8R correspond to the limit of the relative speed where the relative speed is low enough so that secondary crash inflicting injury on a vehicle occupant does not occur even if the primary crash occurs. That is to say it is set to produce a signal only when a dangerous crash would occur.

Figure 7:
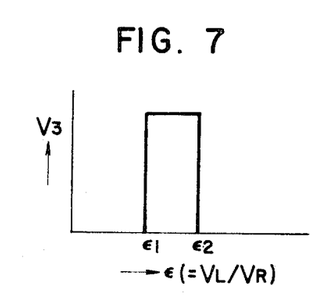
FIG. 7 is an operational characteristic diagram of the comparator used in the circuit of an embodiment of this invention.

The voltage setting range of the comparator 13 depends on the limit of what would be a mere contact which is indicated by the relative angle $\theta$. This range is determined so that the output signal $V_3$ issues when $\epsilon$ comes within the range between $\epsilon_1$ and $\epsilon_2$ obtained from calculation and illustrated in FIG. 7.

The presence of the object m in the sensitive region defined by the antennas is indicated by issuance of signals from either of the threshold circuits 9L or 9R. The magnitude of the relative speed v can be determined by the output signal from either of the threshold circuits 8L or 8R. Thus, the inevitability of a primary crash can be detected by the existance of an output signal from the comparator 13. The output signal $V_2$ of the AND gate circuit 14 represents a collision detecting signal.

The apparatus described above detects the imminence of a potential collision, with certainty, prior to occurrence of the primary crash. Thus, it makes possible the inflation of an air bag capable of absorbing the impact energy from a secondary crash well in advance of the occurrence of the secondary crash and with thorough certainty and reliability. Formation of the sensitive region in measuring the relative distance between the vehicle and the object completely eliminates shortcomings such as the variation of reflected factor due to the material of the object $m$, the shape and other chracteristics of the object, the variation of the energy of the reflected signal due to the size of the object, and the variation due to weather conditions such as rain, snow, or the like. This greatly raises the accuracy of detection of a potential collision. Additionally the provision of the object detecting means at both sides of the vehicle M makes it possible to detect with certainty whether a vehicle is on a collision course with an object or whether they will pass each other. Therefore, there is virtually no possibility of erroneous actuation of the safety device even in cities and towns where traffic volume is quite high.

If the sensitive region or zone is appropriately set, the detection of a potential collision can be accurately accomplished without detecting the relative angle. In such a case it is not necessary to provide two sets of transmitting and receiving antennas at both sides of a vehicle.

In the above described embodiment, one pair of transmitting and receiving antennas is provided on the left side of the vehicle and one pair on the right side of the vehicle. According to another embodiment of the invention one transmitting antenna is located in the center of the vehicle and two receiving antennas are located at the left and right sides.

According to one embodiment of the invention, the directional couplers 4R and 4L are employed as a means for carrying out homodyne detection. When the received signal is to be obtained by homodyne detection, it is obtained by comparing the phase of the transmitted signal and that of the reflected signal. Therefore, if the object $m$ within the sensitive region gets closer to the vehicle by one half wavelength of the microwave signal, the path of undulatory signal is decreased by one full wavelength. Thus the phase is advanced 360°. In other words, the phases of the transmitted and received signals are advanced 360° each time the relative distance between the vehicle and the object is changed by a half wavelength. When the phases are synchronized during the above period the phases overlap, producing peaks. If the phases deviate by 180°, an anti-phase results. This produces dips. Thus the frequency $f_s$ of the signal to be obtained by homodyne detection as the vehicle approaches the object is expressed by the formula:

$$f_s = \frac{1}{\frac{\lambda}{2}/v} = \frac{2v}{\lambda} \quad (5)$$

here $\lambda$ is the wavelength of the microwave signal. Since the wavelength $\lambda$ can be expressed as $c/f_t$, the formula (5) can be rewritten as follows:

$$f_s = (2f_t/c) v \quad 6$$

This can be interpreted to means that the frequency $f_s$ of the undulatory signal obtained by homodyne detection is equal to the Doppler frequency $f_d$. In other words, detection of a potential collision can be done in the same manner as described herein before by measuring the frequency of the signal obtained by homodyne detection.

According to another embodiment of the invention homodyne detection is accomplished by employing a combination of conventinal 3-port circulators instead of the directional couplers 4L and 4R. In either case, as described above, embodiments according to the invention detect a potential collision accurately and with certainty in advance of such collision by utilizing the undulatory signals to provide a sensitive region, or a sensitivity zone, in measuring the relative speed.

While embodiments of the invention have been described in detail it will be obvious to those skilled in the art that the invention may be embodied otherwise without departing from its spirit and scope.

What is claimed is:

1. A system for responding to potential collisions of a conveyance and an object, comprising transmitting means mounted on said conveyance for transmitting undulatory radiation along a pattern having defined bounds, receiving means mounted on said conveyance for receiving reflected undulatory radiation along a second radiation pattern having defined bounds, said transmitting means and said receiving means being vertically displaced relative to each other, said patterns having vertical and horizontal bounds, said transmission and receiving means forming the patenrs so as to cause the second pattern to intersect the first radiation pattern at a sufficient vertical angle so as to define with the vertical bounds of the first pattern at the intersection of the patterns a sensitivity region having horizontally defined bounds at least at the portion of the region more remote from the conveyance than the remainder of the region, detecting means responsive to said receiving means and transmitting means for responding to the frequency received by said receiving means different from the first frequency and for producing an indication when the difference exceeds a predetermined difference.

2. A system as in claim 1, wherein said transmitting means includes antenna means on the conveyance and coupled to said detecting means for transmitting the undulatory radiation along the first pattern, and wherein said receiving means includes receiving antenna means mounted on said conveyance and coupled to said detecting means for receiving the undulatory radiation along the second pattern, said antenna means each directing their pattern ahead of the vehicle so the patterns intersect at an acute angle.

3. A system as in claim 1, wherein said detecting means includes Doppler sensing means for producing a Doppler signal which is a measure of the speed of an object in the sensitivity zone, said horizontal patterns being sufficiently wide so that the sensitivity zone extends across the width of the conveyance.

4. A system as in claim 3, wherein said detecting means includes frequency to voltage converter means coupled to said Doppler means for producing a voltage proportional to the frequency of the Doppler signal, said detecting means further including threshold means connected to said converter means for inhibiting the output signal unless it exceeds a given value.

5. A system as in claim 4, wherein said detecting means further includes second threshold means connected to said Doppler sensing means for producing a control signal only when the level of the Doppler signal exceeds a predetermined value, and AND means for producing signals only in response to signals from both of said threshold means.

6. A system as in claim 1 wherein the pattern defined by said receiving means includes a plurality of beams each intersecting the transmitted pattern, and wherein said detecting means detects the difference between the frequency of said pattern and the frequency of reflected signals received along each of the beams, and output means in said detecting means for producing an output only when the differences between each of the reflected signals received by said receiving means and the first frequency exceeds a predetermined difference, said horizontal patterns being sufficiently wide so that the sensitivity zone extends across the width of the conveyance.

7. A system as in claim 6, wherein said detecting means includes Doppler sensing means for each of the beams and the pattern.

8. A system as in claim 7, wherein said detecting means includes a plurality of frequency to voltage converter means each coupled to one of said detecting means for producing a voltage proportional to the frequency of the Doppler signal, said detecting means further including a plurality of threshold means each connected to said converter means for inhibiting output of signals from said converter means unless the signal exceeds a given value.

9. A system as in claim 8, wherein said detecting means includes a plurality of second threshold means each connected to said Doppler sensing means for producing a signal from each only when the level of the corresponding Doppler signal exceeds a predetermined value, and AND means connected to each of said first and second threshold means for producing signals only when both of said first and second threshold means produce signals.

10. A system as in claim 6, wherein said detecting means includes divider means for comparing the frequency differences established in said detecting means for each of the beams and the pattern, and comparator means for inhibiting the output signal unless the comparison lies within a predetermined range.

11. A system as in claim 9, wherein said detecting means includes dividing means connected to each of said frequency to voltage converter means for establishing a relationship between the frequency differences detected by said Doppler means, and comparator means for producing a signal and applying it to said AND means only when the relationship lies with a given range.

12. A system as in claim 6, wherein said transmitting means includes a plurality of transmitting antennas and said receiving means includes a plurality of receiving antennas vertically displaced from respective ones of said transmitting antennas, each transmitting antenna transmitting undulatory radiation along the beam and each receiving antenna defining a beam vertically intersecting at least one of the beams transmitted by said transmitting antenna.

13. A system as in claim 10, wherein said transmitting means includes a plurality of transmitting antennas and said receiving means includes a plurality of receiving antennas vertically displaced from respective ones of said transmitting antennas, each transmitting antenna transmitting undulatory radiation along a beam, each receiving antenna defining a beam vertically intersecting at least a respective one of the beams transmitted by said transmitting antennas.

14. A system as in claim 11, wherein said transmitting means includes a pair of transmitting antennas and said receiving means includes a pair of receiving antennas vertically displaced from respective ones of said transmitting antennas, each transmitting antenna transmitting undulatory radiation along a beam, and each receiving antenna defining a beam vertically intersecting a respective one of the beams transmitted by said transmitting antennas, said pair of transmitting antennas being located on opposite sides of the front of the conveyance, said pair of receiving antennas being located on opposite sides of the front of the conveyance.

15. A system as in claim 6, wherein said transmitting means includes a transmitting antenna mounted on the vehicle and said receiving means includes four receiving antennas mounted around said transmitting antenna.

16. A potential collision detecting device, comprising a generator which generates an undulatory signal having a first frequency, a transmitting antenna which radiates said undulatory signal, a receiving antenna having a receiving axis intersecting the radiation axis of the transmitting antenna within a predetermined region and adapted to receive the undulatory signal from a reflected object and having a second frequency, said receiving and transmitting antennas radiating and receiving the undulatory signals along respective beams which are sufficiently narrow and intersect each other at a sufficient angle so that the beams converge and then overlap and then completely diverge from each other, sensing means for obtaining a Doppler signal having a frequency difference between the two frequencies, a frequency voltage converter for obtaining an electrical quantity proportional to the frequency of the Doppler signal, a first circuit which issues signals only when the electrical quantity exceeds a predetermined value, a second circuit which issues a signal only when the level of the Doppler signal exceeds a predetermined value, and an AND circuit for issuing a signal only when both the first and second circuits issue signals, said transmitting antenna and said receiving antenna being vertically displaced relative to each other and producing the beams so that they spread horizontally and so that the beams converge vertically and then overlap vertically and then completely diverge from each other vertically.

17. A potential collision detecting device, comprising a generator for generating an undulatory signal having a first frequency, a first transmitting antenna for radiating said undulatory signal, a first receiving antenna having a receiving axis intersecting the radiation axis of the first transmitting antenna within a predetermined region and adapted to receive reflected signals having a second frequency, said first transmitting and receiving antennas being vertically displaced relative to each other, said first transmitting antenna and said first receiving antenna respectively radiating and receiving the undulatory signals along beams sufficiently narrow in the vertical direction and at a sufficient angle in the vertical direction so that the beams as a whole converge in the vertical direction and then overlap in the vertical direction and then diverge in the vertical direction so that no portion of the beams continue to overlap in the vertical direction, sensing means connected to each of said antennas for obtaining a first Doppler signal having the difference frequency between said two frequencies, a second transmitting antenna which radiates undulatory signals having the first frequency, a second receiving antenna having a receiving axis intersecting the radiation axis of said second transmitting antenna within a predetermined region and adapted to receive reflected undulatory signals having a third frequency, said second transmitting and receiving antennas being vertically displaced relative to each other, said second transmitting antenna and said second receiving antenna respectively radiating and receiving undulatory signals along beams which are sufficiently narrow in the vertical direction and intersect at a sufficient angle in the vertical direction so that the beams first converge in the vertical direction and then overlap in the vertical direction and then diverge in the vertical direction without an overlap in the vertical direction, second sensing means for obtaining a second Doppler signal having the difference frequency between said first and third frequencies, circuit means for obtaining a first electrical quantity proportional to the frequency of the first Doppler signal, second circuit means for obtaining a second electrical quantity proportional to the frequency of the second Doppler signal, said first and second circuit means each being connected to respective ones of said sensing means, a divider connected to said first and second circuit means for obtaining an electrical quantity proportional to the ratio of the first electrical quantity and the second electrical quantity, first comparator means connected to said divider for issuing signals only when the output of said divider is within a predetermined range, second comparator means connected to said first circuit means for issuing signals only when the first electrical quantity exceeds a predetermined value, third comparator means connected to said second circuit means for issuing signals only when the second electrical quantity exceeds a predetermined value, a first OR circuit connected to the outputs of said second and third comparator means for calculating the existence of outputs at either of said comparator means, a fourth comparator means connected to said first sensing means for deriving as output when the level of said first Doppler signal exceeds a predetermined value, fifth comparator means connected to said second sensing means for deriving an output when the level of the second Doppler signal exceeds a predetermined value, a second OR circuit connected to said fourth and fifth comparator means for passing the signals from either of said fourth or fifth comparator means, and an AND circuit connected to said first comparator means, said first OR circuit and said second OR circuit for issuing signals when output signals simultaneously appear at said first comparator means, said first OR circuit and said second OR circuit, said antennas radiating and receiving beams wider in the vertical direction than the horizontal direction so as to cause the overlaps formed by the beams to extend across the width of the conveyance but remain within the width of the conveyance.

18. A system as in claim 1, further comprising output means for producing an actuating signal, barrier means for producing a safety barrier at locations in the conveyance where passengers are expected to strike the conveyance in the event of a collision, said barrier means being actuated by said output means.

19. A system as in claim 1, wherein said transmitting means and said receiving means define the patterns at such an angle that the sensitivity region formed thereby is completely bounded.

20. A vehicle for carrying passengers, comprising structure means having a front and a rear end, electrically actuable safety means mounted on the structure for selectively inserting a barrier between passengers and the structure in the event of a collision of the vehicle, transmitting means mounted on the front of said structure for transmitting undulatory radiation along a pattern having defined bounds, receiving means mounted on the front of said structure for receiving reflected and undulatory radiation along a second radiation pattern having defined bounds and intersecting the first pattern at a sufficient angle so as to define with the bounds of the patterns at the intersection of the patterns a sensitivity region, said transmitting means and said receiving means transmitting and receiving the undulatory radiation along the patterns so that the patterns first converge and then overlap and then stop overlapping and diverge without overlap, detecting means responsive to said receiving means and said transmitting means for responding to frequencies received by said receiving means different from the frequency by said transmitting means and producing a signal when the difference exceeds a predetermined difference, output means connected to said detecting means and responsive to the thus produced signal and connected to said safety means for producing an actuating signal actuating said safety means, said transmitting means having a transmitting antenna transmitting the undulatory radiation along the pattern, said receiving means having a receiving antenna vertically aligned with the transmitting antenna and receiving the reflected undulatory radiation along the second radiatisn pattern, the second radiation pattern intersecting the first radiation pattern at a vertical angle, the antennas transmitting and receiving the undulatory radiation along the patterns so that the patterns first converge vertically and then overlap vertically and then stop overlapping vertically and diverge without overlap vertically, said antennas producing bounds so the overlap is wider horizontally than vertically.

21. A system as in claim 1, wherein the patterns first converge vertically, then overlap vertically and then stop overlapping vertically and diverge vertically. 3

22. A system as in claim 1, wherein said transmitting means including first and second transmitting antennas, said receiving means including a first receiving antenna vertically aligned with said first transmitting antenna and a second receiving antenna vertically aligned with said second transmitting antenna, said patterns from said transmitting means each having two portions each portion defined by one of said transmitting antennas, said patterns of said receiving means having two portions each portion being formed by one of said receiving antennas, said transmitting means and said receiving means forming two overlap portions, said first transmitting and receiving antennas forming the first overlap portion and said second transmitting and receiving antennas forming the second overlap portion, said overlap portion extending only along the dimension of the conveyance transverse to the direction of the patterns from the antennas, the patterns extending from the antennas substantially in the direction forward of the conveyance.

23. A system as in claim 1, wherein the region extends only up to a finite distance from the conveyance and back toward the conveyance.

24. An apparatus as in claim 23, wherein objects within the region closer to the conveyance than said distance reflect radiation from said transmitting means to said receiving means, and objects outside of the region and beyond said distance fail to reflect radiation from said transmitting means to said receiving means.

25. A system as in claim 24, wherein said distance is less than several car lengths.

26. A system as in claim 24, wherein said distance is less than one car length.

27. A system as in claim 1, wherein the portion of the region more remote from the conveyance than the remainder of the region is less than one car length.

28. A system as in claim 16, wherein said beams stop overlapping and begin to diverge less than one conveyance length from the conveyance.

* * * * *